United States Patent [19]
Brown et al.

[11] Patent Number: 5,828,965
[45] Date of Patent: Oct. 27, 1998

[54] WIRELESS TELEPHONE HANDSET

[75] Inventors: Michael Brown; Laura A. Mahan; Andre J. Van Schyndel, all of Kanata; Hugh M. Collins; Frederic Simard, both of Nepean; Christopher M. Forrester, Ottawa, all of Canada

[73] Assignee: Northern Telecom Limited, Montreal, Canada

[21] Appl. No.: 720,277

[22] Filed: Sep. 26, 1996

[51] Int. Cl.⁶ .................................................. H04Q 7/32
[52] U.S. Cl. ........................... 455/550; 379/433; 379/428
[58] Field of Search .................................. 455/462, 219, 455/550; 379/433, 79, 159, 428, 420, 447; D14/248, 249, 138, 147

[56] References Cited

U.S. PATENT DOCUMENTS

D. 361,064  8/1995  Fellinger .
D. 392,285  3/1998  MacDonald et al. .
5,224,151  6/1993  Bowen et al. .

*Primary Examiner*—Curtis A. Kuntz
*Assistant Examiner*—Linwood C. Scott, Jr.
*Attorney, Agent, or Firm*—R. J. Austin

[57] ABSTRACT

Portable wireless telephone handset with a flap movable upon a housing. In a first position the flap is close to a speaker to enable the flap to be disposed near to a user's ear for the user to receive personal low volume sound from the speaker. In a second position, the flap is further from the speaker to detract from use of the speaker near to the user's ear. In the second position of the flap, the speaker operates in loudspeaker mode. A switch is provided to change the speaker between loudspeaker and low volume sound mode, the switch operation being dependent upon flap position.

4 Claims, 2 Drawing Sheets

# WIRELESS TELEPHONE HANDSET

This invention relates to wireless telephone handsets.

Wireless telephone handsets are used with their speakers emitting low volume sound, i.e., in a personal low volume sound mode, so that the handsets are for use on a personal basis close to the head of the user. This is normal for conventional handsets wired into telephone circuits also. It has been recognized that a great deal of convenience would be obtained if it were possible to use wireless telephone handsets alternatively in a handsfree or loudspeaker mode in which higher volume sound is emitted, so as to enable users to locate the handsets further from the head in order to receive audio with their hands completely free. A problem which needs to be overcome with such a handsfree or loudspeaker handset, however, is that it is necessary to ensure that the operation of the handset is such that it cannot be located against the head of a user while in the loudspeaker mode as this could cause extreme user discomfort and may even damage the ear. One solution to this problem has been suggested in U.S. Pat. No. 5,224,151 granted on Jun. 29, 1993 in the name of D. J. Bowen et al. That patent is concerned with a portable wireless handset having both a personal low volume sound mode and an alternative loudspeaker mode. Whichever mode is being used at any particular time is dependent upon the operation of a range detection apparatus. The range detection apparatus is intended to operate dependent upon the distance of the handset from the ear of a user whereby for personal usage the range detector apparatus ensures that only the personal low volume sound mode is used. Alternatively with the handset disposed at a sufficient distance from the ear, the range detection apparatus converts the handset usage to the loudspeaker mode.

The present invention seeks to provide a wireless telephone handset which is usable alternatively and selectively in the personal low volume sound mode or in the loudspeaker mode and which is also of simple operation.

Accordingly the present invention provides a wireless telephone handset comprising a housing carrying speaker means, a flap mounted upon the housing and moveable between a first position close to the speaker means for location of the flap close to an ear of the user in use of the handset, and a second position in which it is further from the speaker means so as to detract from use of the handset close to the ear, and switch means controlled by the position of the flap to cause operation of the speaker means in a personal low volume sound mode with the flap in the first flap position, and to provide a loudspeaker sound mode of the speaker means with the flap in the second position.

Hence, the mode of use of the speaker means is dependent upon the flap position. Thus, with the flap in its position close to the speaker means, the handset is suitable for use by positioning close to the ear of the user, in which case a microphone of the handset will necessarily be positioned close to the mouth of the user. Alternatively, with the flap in the second position, it is intended that the flap will prevent the person from locating the speaker means close to his ear, which will render the handset unusable for personal low volume sound usage.

The telephone handset is thus of simple structure and operation with regard to its changing mode between low volume and loudspeaker usage with the flap position dictating the method of operation of the handset. While the speaker means could include a first and second speakers, i.e., one for personal low volume sound mode usage and the other for loudspeaker mode usage, preferably to simplify the construction further, the speaker means comprises a single speaker having an amplifier circuit which by virtue of a switch controlled by the flap position, dictates whether the speaker means operates in the low volume or loudspeaker modes.

While the flap may be movable in any desired manner between its first and second positions, e.g., by sliding between those two positions, it is preferable for the flap to be pivotably moveable between the first and second positions. In the first position the flap overlies the speaker and in the second position it preferably extends at an angle outwardly and away from the speaker means in such manner as to prevent the user's ear from being located close to the speaker means.

One embodiment of the invention will now be described, by way of example, with reference to the accompanying drawings, in which.

Figure 1:
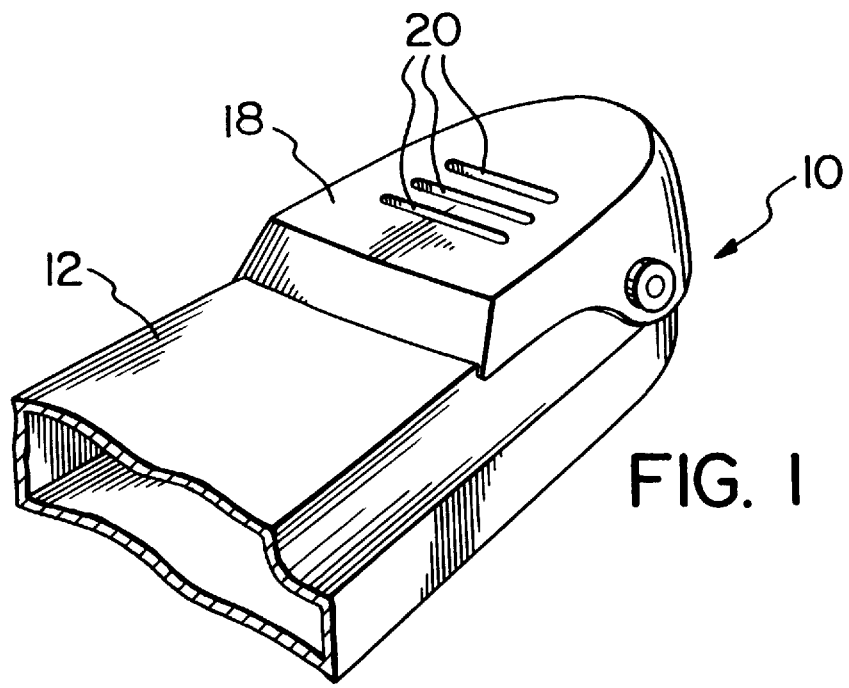
FIG. 1 is an isometric view of a portable wireless telephone handset according to the embodiment.

In the embodiment, a portable wireless telephone handset 10 has a casing 12 within which is contained wireless telephone circuitry, which may be that known in the art, this circuitry being for transmitting wireless signals from a microphone 13 and for receiving wireless signals and transmitting audio signals from a speaker 14 to a user's ear. As is conventional for handsets, the speaker 14 and microphone 13 are positioned a suitable distance apart along the handset for simultaneous location adjacent to the mouth and to the ear of a user for transmitting and receiving signals. As shown by FIG. 3, the speaker 14 is located within the housing 12 so as to direct audio signals outwardly through apertures 16 in the housing (also see FIG. 2).

The handset is provided with a flap 18. This flap is movable between a lowered and raised positions, respectively, in which it lies closely adjacent to and overlies the speaker 14 (FIG. 1) and in which it is spaced away from the speaker (FIG. 2) as will now be described. The flap 18 is pivoted along one edge to an end of the housing 12 and, in the lowered position, lies along the top of the housing and over the speaker 14 as just discussed so as to overlie the apertures 16. Apertures 20 in the flap 18 aligned with the apertures 16 permit audio signals from the speaker to pass through the flap 18 with the flap in the lowered position (see FIG. 1). Thus with the flap in the lowered position (see also the full outline position in FIG. 3), the handset may be positioned close to the head of a user with the microphone 13 adjacent to the mouth and with the flap 18 adjacent to the ear and while permitting the ear to be in close proximity with the speaker 14 for receiving audio signals.

Figure 2:
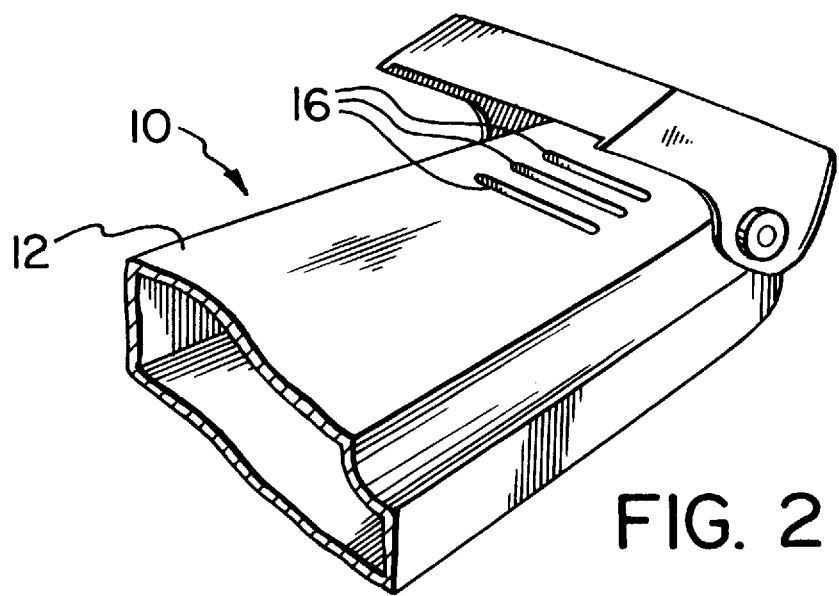
FIG. 2 is a view similar to FIG. 1 and showing parts in different relative positions.
Figure 3:
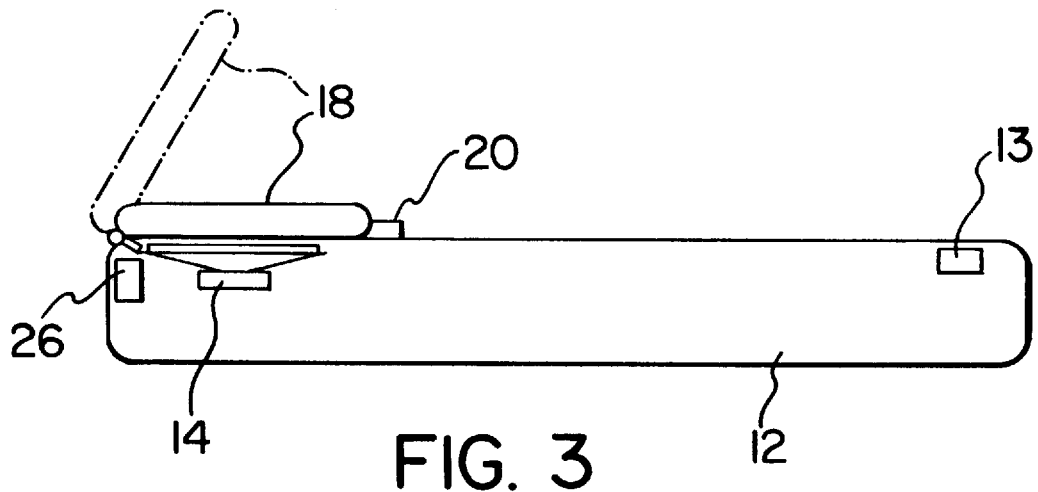
FIG. 3 is a diagrammatic cross-sectional view of the handset taken along line III—III in FIG. 1 and to a smaller scale.

Alternatively the flap may be pivoted to incline it into the raised position as shown in FIG. 2 and chain-dotted in FIG. 3. In this position of the flap, not only does the flap detract the user from attempting to use the handset close to his head, but virtually makes it impossible to do so. In particular the ear cannot be positioned against the flap while being able to locate the mouth of the user to use the microphone 13 and the inclined flap position prevents the user's ear from being placed against the apertures 16. A spring loaded latch 20 is used to hold and release the flap from the lowered position.

The position of the flap controls a switch means which is connected in circuit with a variable gain amplifier 22

Figure 4:
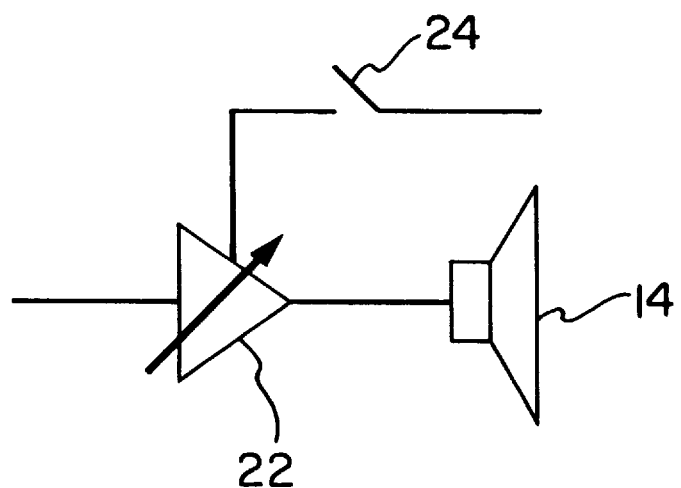
FIG. 4 is a circuitry for operation of a speaker of the handset.

(through the speaker 14). The switch means comprises a mechanical switch 24 operated by pivotal movement of the flap 18. Alternatively, the switch means comprises an electrical switch 26 operated by an automatic position sensor which senses when the flap 18 is in a close position to the switch, i.e., when the flap is in the lowered position. The switch 24, as shown by FIG. 4, controls the amplifier 22 and is actuated with the flap 18 in the lowered position so that the amplifier acts to cause the speaker to operate in a personal low volume sound mode whereby the user may comfortably use the handset close to his head. However, with the flap 18 in the raised position, the switch is operated to provide gain to the amplifier to place the speaker in a loudspeaker mode. In the loudspeaker mode, and with the flap in the raised position, the user will have no reason to attempt to apply the handset to his ear as it will be impractical to do so. Instead, he will place it at some distance away, thereby rendering his hands free. Obviously, when the flap 18 is returned to the lowered position, then the speaker reverts to its personal low volume sound mode of operation.

As may be seen from the above embodiment, the invention provides in simple fashion a portable wireless telephone handset which may be used with the speaker in a personal low volume sound mode or in a loudspeaker mode. In providing such a structure, the flap ensures that the user will not attempt to use the handset near the ear with the speaker in the loudspeaker mode, thereby ensuring that no damage or discomfort can be caused to the ear of the user. In addition to this, the structure is preferably used and as in the embodiment, with a single speaker which is capable of providing both the personal low volume sound and loudspeaker modes.

What is claimed is:

1. A portable wireless telephone handset comprising:

a housing carrying speaker means, a flap mounted upon the housing and moveable between a first position close to the speaker means for location of the flap adjacent to an ear of the user in use of the handset, and a second position in which the flap is further from the speaker means, to detract from use of the handset close to the ear, and switch means controlled by the position of the flap, to cause operation of the speaker means in a personal low volume sound mode with the flap in the first flap position, and to provide a loudspeaker sound mode of the speaker means with the flap in the second position.

2. A handset according to claim 1 wherein the flap is pivotably moveable upon the housing between the first and second positions and overlies the speaker means in the first position and, in the second pivotal position, extends angularly away from the housing.

3. A handset according to claim 2 wherein the speaker means comprises a single speaker, amplifier means being provided which is operable by the switch means to place the speaker selectively in either the personal low volume sound mode or the loudspeaker mode.

4. A handset according to claim 1 comprising a single speaker and wherein the flap is pivotably moveable upon the housing between the first and second positions, and in the first position the flap lies along and in contact with the housing in a location to overlie the speaker and close to the housing and in the second position, to extend angularly outwardly from the housing and away from the speaker.

\* \* \* \* \*